United States Patent [19]

Carver et al.

[11] 4,312,329
[45] Jan. 26, 1982

[54] FOCUS IMPROVER AND SOLAR ENERGY COLLECTOR

[75] Inventors: Thomas R. Carver, Princeton, N.J.; Fontaine C. Armistead, Darien, Conn.

[73] Assignee: Texaco Development Corporation, White Plains, N.Y.

[21] Appl. No.: 172,601

[22] Filed: Jul. 28, 1980

Related U.S. Application Data

[63] Continuation of Ser. No. 965,136, Nov. 3, 1978, abandoned.

[51] Int. Cl.³ .......................... F24J 3/02; G02B 5/08
[52] U.S. Cl. .................................. 126/439; 126/425; 350/292; 350/299
[58] Field of Search ............... 126/417, 424, 425, 438, 126/439, 450, 451; 350/288, 292, 293, 299

[56] References Cited

U.S. PATENT DOCUMENTS

| | | | |
|---|---|---|---|
| 1,421,506 | 7/1922 | Limpert | 126/438 |
| 2,803,591 | 8/1957 | Coanda et al. | 126/438 |
| 3,964,464 | 6/1976 | Hockman | 126/438 |
| 4,022,186 | 5/1977 | Northrup | 126/438 |
| 4,027,651 | 6/1977 | Robbins | 126/439 |
| 4,047,517 | 9/1977 | Arnberg | 126/439 |
| 4,171,695 | 10/1979 | Sletten | 126/438 |

*Primary Examiner*—Daniel J. O'Connor
*Attorney, Agent, or Firm*—Carl G. Ries; Robert A. Kulason; Henry C. Dearborn

[57] ABSTRACT

A focus improver for a concave reflector having a circular cross section. It has an array of plane mirrors diametrically across the mouth of the reflector. The angle of tilt of the mirrors is relative to parallel rays incident upon the reflector, and each mirror has an angle of tilt such that a central parallel ray reflected therefrom will focus at a common location.

An application of the focus improver provides a solar energy collector that employs a cylindrical reflector which may be oriented in an east-west direction. The mirrors are thin strips that are coextensive in length with the cylindrical reflector. And, a solar energy utilization device may be located along the focal line that is created.

16 Claims, 9 Drawing Figures

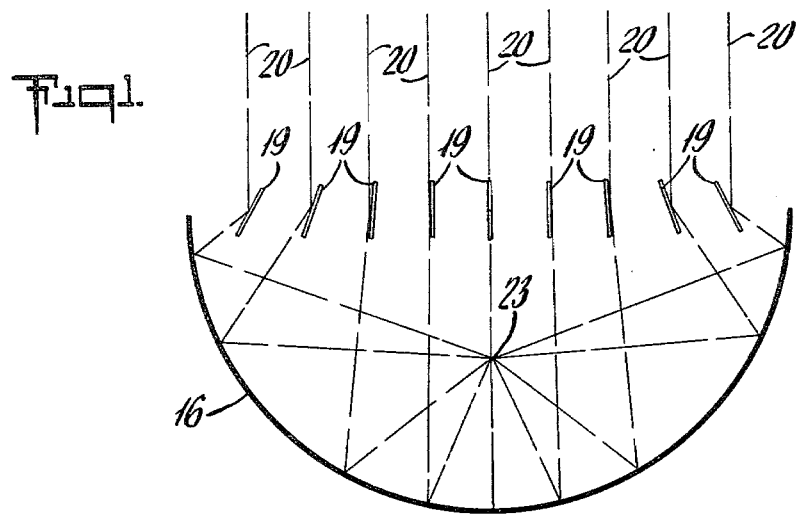
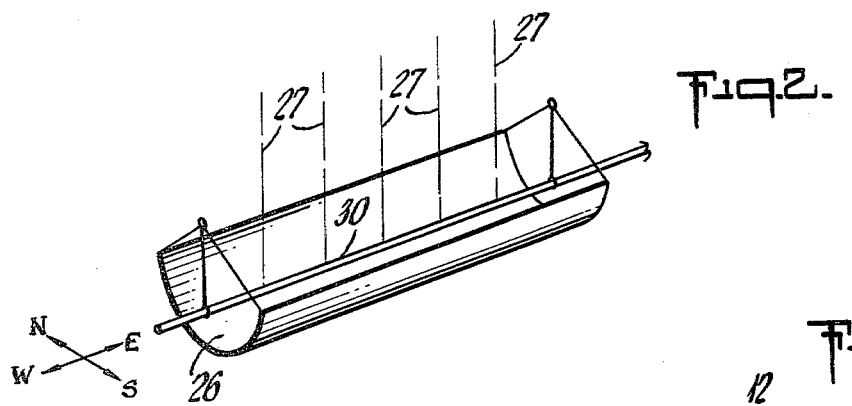
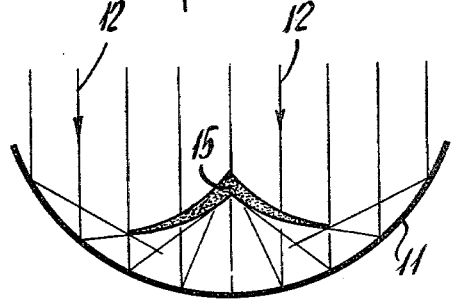
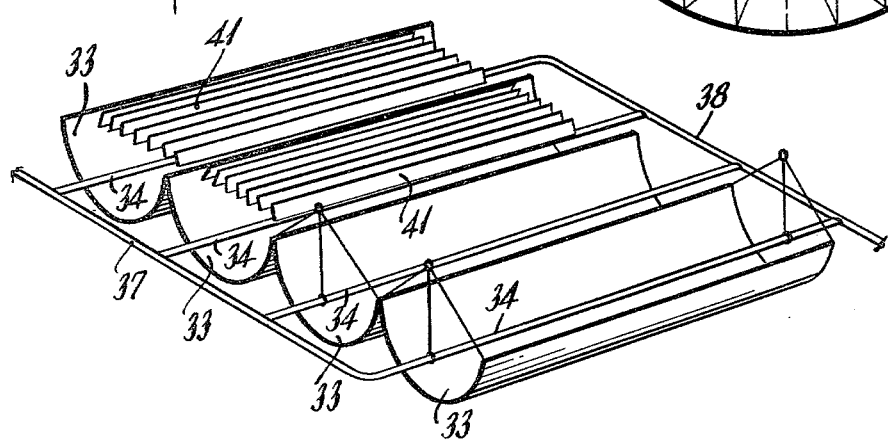

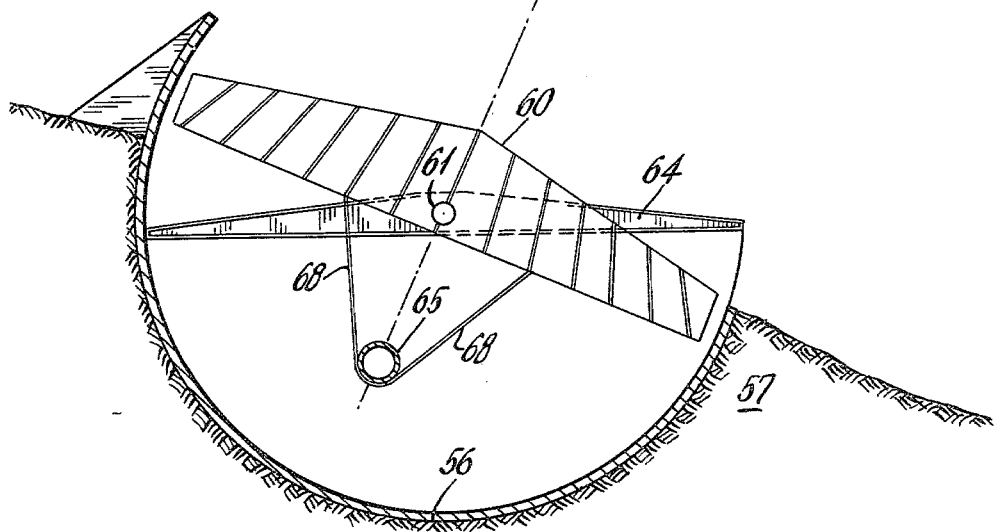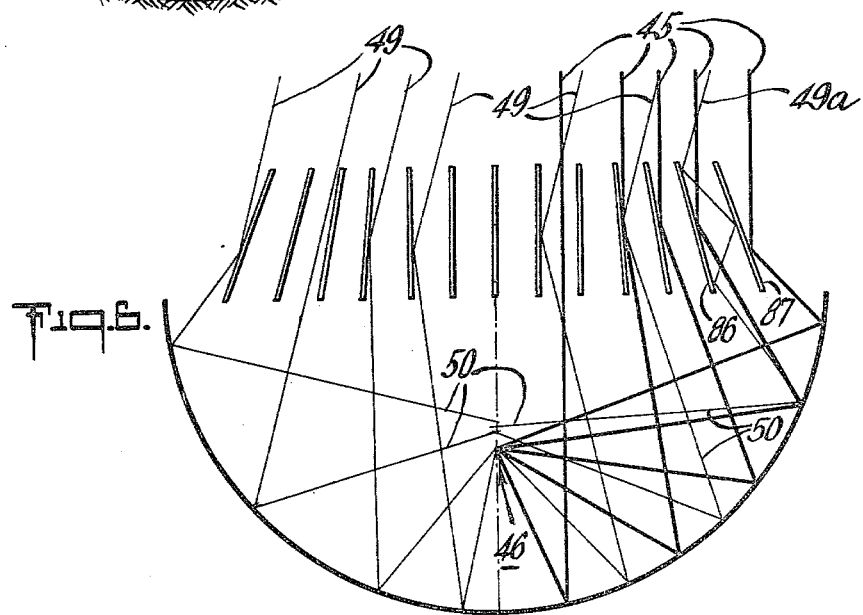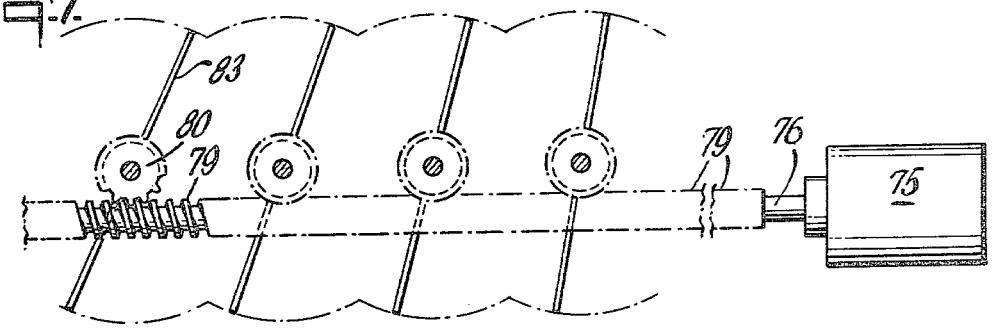

FOCUS IMPROVER AND SOLAR ENERGY COLLECTOR

This is a continuation of application Ser. No. 965,136, filed Nov. 3, 1978, now abandoned.

BACKGROUND OF THE INVENTION

1. Field of the Invention

This invention concerns a focus improver for concave reflecting surface of a circular cross section. It also relates to an application of such improver for solar energy collection.

2. Description of the Prior Art

It is well known that a parabolic reflecting surface provides the optimum concentration of parallel rays. Similarly, the laws of optics teach that parallel rays reflected from circular surfaces will not focus at a common location, but rather will form a caustic of the reflected light rays instead of a common focal location. Such optical results of reflections from a spherical surface is known as spherical abberation and, where the concave reflecting surface is cylindrical, it would be termed cylindrical aberration. However, the elimination of the aberration created by a circular surface has heretofore necessitated the use of a parabolic surface, and fabrication of such parabolic surface is much more difficult and costly than a circular type surface.

A compound concentration lens system has been proposed for use with a solar energy collector system. For example, a known system employed a compound concentration lens system for concentrating solar rays, in addition to a series of prism-type light transmission sections on the edges of the lens for directing the sun's rays to a central location. That system required passage of the sun's rays through the lens and prism sections in order to reach the focal location. The known system is described in U.S. Pat. No. 4,022,186 Northrup, Jr., dated May 10, 1977.

On the other hand, a concave reflector structure has the advantage over a lens type system that it is easier and less costly to make and also that it causes no absorption of the sun's rays such as would be involved in a lens type system. Consequently, it is an object of this invention to provide a focus improver for a concave reflector that has a circular cross section.

Another object of the invention is to provide an application of a focus improver, according to the foregoing, which will result in an improved solar energy collector that is relatively inexpensive and yet quite efficient.

SUMMARY OF THE INVENTION

Briefly, the invention concerns a solar heat collector. It comprises a concave cylindrical reflecting surface, plus a plurality of narrow flat reflecting strips having reflecting surfaces on both sides thereof. Said strips are oriented with the longitudinal dimensions thereof parallel to the geometric axis of said cylindrical surface. The said strips are located with the longitudinal axes spaced diametrically across relative to said cylindrical surface, and said strips are set at predetermined angles to correct for cylindrical aberration in focusing of parallel rays directed toward said concave reflecting surface. The solar heat collector also comprises a conduit located parallel to the geometric axis of said cylindrical surface and at the focal line of said parallel rays. The said conduit is adapted for carrying a fluid to be heated therein.

Again briefly, the invention is in combination with a cylindrical reflector having a circular cross section. It concerns focus improving means for incident parallel rays, and it comprises an array of plane mirrors diametrically situated relative to said cylindrical reflector. Each of said mirrors is thin and reflects from both faces thereof. Each of said mirrors extends longitudinally parallel to the axis of said cylindrical reflector. And, each of said mirrors has an angle of tilt relative to said parallel rays such that a central line of rays incident upon the longitudinal axis of each mirror, will focus along a common line parallel to the axis of said cylindrical reflector.

Again briefly, the invention is in combination with a reflector that has a circular cross section. It concerns focus-improving means for incident parallel rays, which comprises an array of plane mirrors. Each of said mirrors has an angle of tilt relative to said parallel rays such that a central parallel ray incident upon each mirror will focus at a common location.

Once more briefly, the invention concerns a solar energy collector which comprises in combination an elongated cylindrical reflector adapted for east-west orientation. It has a longitudinal plane of symmetry. And, it has a plurality of thin strip reflectors which have reflecting surfaces on both sides thereof, and are mounted with the longitudinal axes thereof parallel to said east-west orientation. The said longitudinal axes lie in a diametrical plane relative to said cylindrical reflector, and the said strip reflectors have the planes thereof oriented at angles relative to said plane of symmetry for correcting cylindrical aberration of said cylindrical reflector in order to focus said solar energy along a line on said plane of symmetry. The collector also comprises means for moving said strip reflectors in order to accomodate the seasonal variations in angle of elevation of the sun. The said moving means comprise gear means concentric with said thin strip longitudinal axes, and worm means for rotating said gear means simultaneously through equal angles in order to vary said orientation angles in carrying out said seasonal accommodation.

BRIEF DESCRIPTION OF THE DRAWINGS

The foregoing and other objects and benefits of the invention will be more fully set forth below in connection with the best mode contemplated by the inventors of carrying out the invention, and in connection with which there are illustrations provided in the drawings, wherein:

FIG. 1 is a schematic illustration showing the principles of the invention;

FIG. 2 is a perspective, schematically indicating the use of an embodiment of the invention in collecting solar energy;

FIG. 3 is a schematic cross sectional illustration, used for explaining the principles of the invention;

FIG. 4 is a perspective, schematically illustrating a multiple solar energy collector structure according to the invention;

FIG. 5 is a schematic cross-sectional illustration showing a structure for solar energy collection, as mounted in the side of a hill;

FIG. 6 is a schematic cross-sectional diagram, illustrating conditions of parallel energy rays acting upon structure according to the invention, both parallel to the axis of symmetry and at an angle thereto;

FIG. 7 is a schematic illustration, showing structure for varying the angles of tilt of strip reflectors simultaneously, in accordance with a modification of the invention;

DESCRIPTION OF THE PREFERRED EMBODIMENTS

Figure 8:
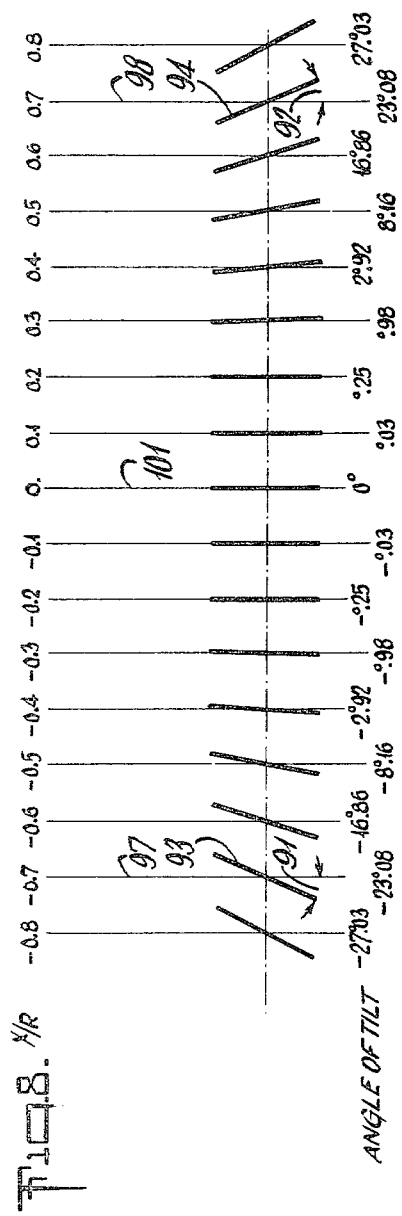
FIG. 8 is a diagram illustrating angles of tilt in relation to radial locations of strip reflectors.

FIG. 1 illustrates the principles of the invention. And, FIG. 3 illustrates conditions of focus where parallel incident rays reflect from a surface having a circular cross section without correction for spherical or cylindrical aberration.

It is known that, in order to obtain the optimum focus for parallel rays incident upon a curved reflecting surface, the shape of the surface should be parabolic. However, a parabolic surface curvature is quite costly to manufacture, especially when compared to a circular surface.

The results of uncorrected reflections from a concave circular surface are illustrated in FIG. 3. There is there shown a concave circular reflecting surface 11 that has incident parallel rays 12 directed thereagainst. Reflection of the rays 12 from the circular surface 11 results in a dispersed focus known as a caustic 15. Such a caustic has a maximum concentration near the center but disperses the converging rays for a substantial distance on either side of the center.

In accordance with this invention, it has been discovered that a substantial improvement in focusing of parallel incident rays directed onto a circular reflecting surface, may be obtained. Thus, with reference to FIG. 1, there is illustrated a reflector 16 which has a circular cross sectional shape. And, there is an array of plane mirrors 19 that have the centers thereof diametrically located, relative to the reflector 16. Consequently, a substantially improved focus may be had in regard to incident parallel rays, e.g. rays 20 that are directed toward the concave surface of reflector 16. It will be observed that by properly determining the angles, a central one of the parallel rays 20 which is directed onto each of the mirrors 19, may be caused to reflect from the surface of reflector 16 to a common focal point 23. Therefore, a focus comparable to the focus heretofore obtainable with a parabolic surface (not shown) may be obtained while using a circular reflecting surface.

With reference to FIG. 8, it will be understood by anyone skilled in the art that by following the principles of our discovery as just described and illustrated in FIG. 1, and by applying the geometrical relationships involved, the angles of tilt of individual mirrors may be calculated. Thus, for example, there is a negative angle of tilt 91 (−23°.08) that corresponds to a positive angle of tilt 92 (23.08) for mirrors 93 and 94 respectively, which will produce the desired angles with respect to parallel rays 97 and 98, so that they will focus at a common point (not shown). These rays 97 and 98 are each located at seven tenths of the length of a radius of the circular reflecting surface (not shown) e.g. the reflector 16 that is indicated in FIG. 1. Thus, in FIG. 8 the top row of numbers represent the ratio of the distance (X) from an axis of symmetry 101 to the radius (R) of the circular reflector (now shown). And, the bottom row of numbers represent the corresponding angles of tilt.

Figure 9:
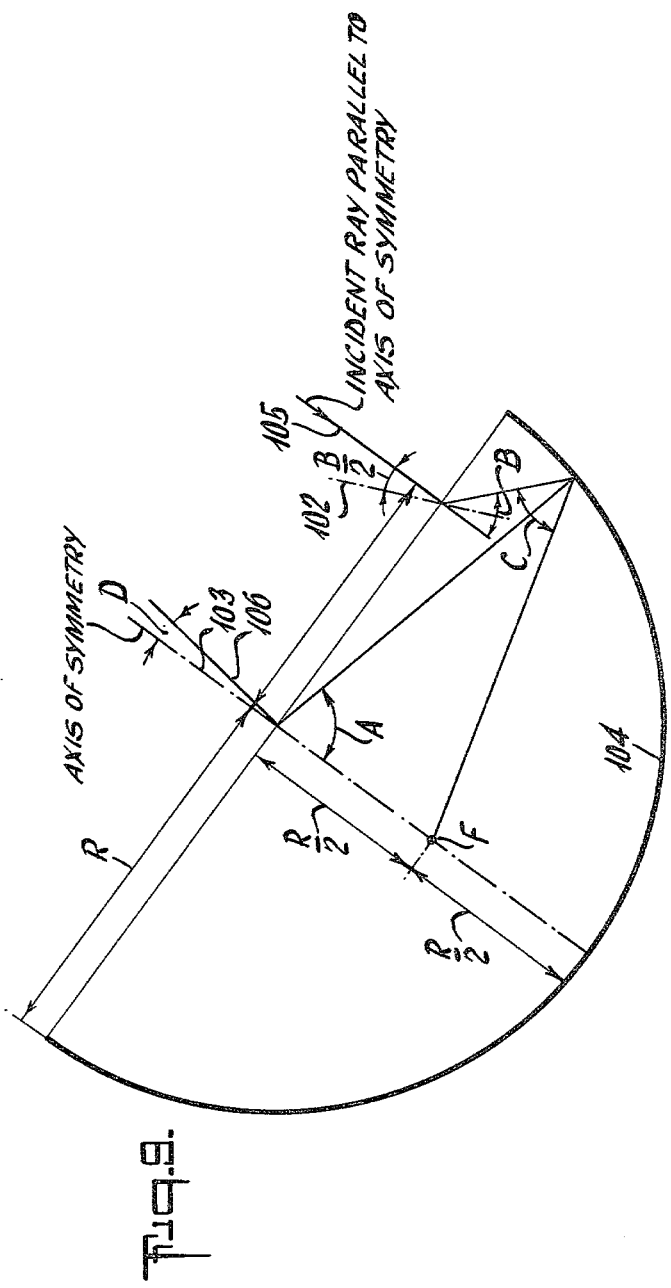
FIG. 9 is a diagram illustrating some of the geometrical relationships involved.

FIG. 9 illustrates the geometric relationships involved in the angle of tilt of the mirrors indicated in FIG. 8. The basis for the calculations to arrive at the angles indicated in FIG. 8 may be explained with reference to FIG. 9. Thus, a mirror 102 is indicated with the center thereof located displaced a distance X from an axis of symmetry 103 of circular reflecting surface 104 which has a radius R, as indicated. The common focal point F is located on the axis of symmetry at a distance of half the radius R. And, an incident ray 105 is to be brought to focus at point F. So the ray 105 is deflected through an angle B and arrives at an angle of incidence C with reflecting surface 104. Then it is reflected at an angle of reflection equal to the angle of incidence in order to intercept the point F. The point of reflection from surface 104 may be characterized as being that point on surface 104 where the radius thereto makes an angle A with the axis of symmetry 103. The angle of tilt of the mirror 102 as measured counter-clockwise from the axis of symmetry is then B/2. Now, for any given mirror location characterized by X/R the correct angle of tilt B/2 may be found by using the following equations:

$$X/R = \sin A - \cos A \tan B \tag{1}$$

$$B = A - C \tag{2}$$

$$C = \arctan [\sin A/(2 - \cos A)] \tag{3}$$

Then, numerical computation yields the angles of tilt shown in FIG. 8.

An application of the principles of the invention to solar energy collection is illustrated schematically in FIG. 2. Thus, there is a cylindrical reflecting surface 26, and energy from the sun (not shown) which is indicated by rays 27, may be collected by having a conduit 30 located parallel to the geometric axis of the reflecting surface 26. The conduit 30 is, of course, located at a focal point relative to the surface 26, such as the point 23 illustrated in FIG. 1. However, if the surface 26 is cylindrical and there are no correcting mirrors employed (according to the invention) the sun's rays would form a poor focus, such as the caustic 15 illustrated in FIG. 3. And therefore, only a relatively small portion of the reflected sun's rays would bear directly upon the conduit 30. But, by orienting the reflecting surface 26 in an east-west direction (as indicated by compass arrows 31), the sun's rays will continue to be reflected toward the focal location, i.e. the conduit 30, from sunrise to sunset. And, by adding strip mirrors (not shown in FIG. 2) like mirrors 19 of FIG. 1, the cylindrical aberration may be corrected so that the reflected sun's rays will be focused onto the conduit 30 during the same time span. To obtain the optimum situation, the reflector 26 (with strip mirrors) should be set so that a plane of symmetry thereof is at the best angle relative to the seasonal angle of elevation of the sun at a given time. Thus, the principles of the invention, as illustrated in FIG. 1, are only applicable for a single seasonal situation absent some additional features or considerations which will be discussed hereafter.

FIG. 4 illustrates schematically how a plurality of solar energy collectors, according to the invention, could be set up as a unit. Thus there is a group of four concave cylindrical reflectors 33, each having a conduit 34 located at the focal point for parallel incident rays directed onto the reflectors 33. These conduits 34 may carry a heat absorbing fluid therein, and they are connected together at each end by a pair of manifolds 37 and 38. It will be understood that there are a plurality of thin strip reflectors 41 for each of the reflectors 33. Such arrays of the thin strips 41 are mounted with the longitudinal axes thereof parallel to the geometric axes of cylindrical reflectors 33. These correcting strips 41 would, of course, be included with all four of the reflectors 33, but only two groups of them are illustrated, for clarity. It will be understood that the strip reflectors 41 are positioned with the planes thereof oriented at angles relative to the plane of symmetry of each cylindrical reflector 33, so that the correction for cylindrical aberration will be made in accordance with the above description relating to FIG. 1.

It is to be noted that the changes in the angle of elevation of the sun at different seasons of the year, may be taken care of in various ways in regard to the action of a solar heat collector according to the invention. Thus, as indicated in FIG. 6, the focusing effect becomes partially lost as the angle of parallel rays, directed toward the reflecting surface, changes from that which is parallel to a plane of symmetry for the reflector having a circular cross section. This is illustrated in FIG. 6 by the indication of heavy line parallel rays 45 that converge to a focal point 46. On the other hand, if the parallel rays, e.g. thin line rays 49, are directed at an angle with the plane of symmetry, the result is a spreading out or smearing of the focus. The latter is indicated by the schematic thin-line reflecting paths 50 that are indicated. It has been observed, however, that the spreading or smearing of the focus is less severe when the strip reflector array of the present invention is used with a cylindrical reflector than when such array is not used.

In order to overcome the indicated seasonal problem, various approaches will be clear to anyone skilled in the art. Thus, the individual aberration correcting strips, e.g. mirrors 19 in FIG. 1, might be rotated about their axes. Or, the entire array might be rotated to maintain the relationship the same as the seasonal angular elevation of the sun. In the former case, the location of the focal point will remain constant, while in the latter, the focal point will move through an arc as the array is rotated.

A structure for accomplishing the second foregoing approach is schematically illustrated in FIG. 5. There is a cylindrical reflector 56 mounted in a hillside 57. An axis of symmetry of the reflector 56 is set at an angle of elevation corresponding with the median angle between the extreme angles of the sun from one season to the next. An array of thin strip reflectors 60 is mounted for being pivoted as a unit about a pivot point 61 that is centrally located on a support member 64. Since the focal point will swing around through an arc as the angle of the array 60 is changed by pivoting around pivot 61, a conduit 65 is supported by braces 68 to remain at a constant location relative to the array 60. Therefore, the array 60 may be pivoted to change its position as the seasonal changes in the elevation angle of the sun take place, and the conduit 65 will continue to be located at the focal point of the sun's rays being focused from reflector 56 with correction by the array 60.

On the other hand, if a stationary condition for the cylindrical reflector and the cooperating conduit or other utilization means for the sun's energy, is desired, the focal point may be kept at one location by roating the individual strip mirrors or reflectors of an array equally in accordance with change in seasonal angle of elevation of the sun. This may be accomplished, for example, by an arrangement schematically indicated in FIG. 7. Thus, there is a motor 75 that drives a shaft 76 which is connected to a worm 79 that meshes with individual gears 80. The gears 80 each have a thin strip reflector 83 fixed thereto. It will be understood that, while the strip reflectors 83 on either side of the axis of symmetry of an array are set at angles which converge with one another, the foregoing rotation of all the strips simultaneously, will make equal changes for all. Consequently, the focal point remains the same even though the strip reflector that has or is nearest to a zero angle of tilt relative to the parallel rays of the sun, will no longer be the middle one. Proof of this manner of correcting for changes in the elevation angle of the sun, may be shown as follows. Thus, with reference to the diagram of FIG. 9, and assuming that the axis of symmetry 103 is the equinoctial angle of elevation of the sun and assuming that a seasonal change in the sun's elevation makes an angle D with that equinoctial angle, as indicated by a ray 106; then, in order to bring every strip mirror's reflected rays back to the same focal point F, every mirror must be given an angular correction by adding the angle $-D/2$. This may be expressed by the following equation:

$$\text{Tilt at } X/R = B/2 - D/2 \tag{4}$$

for any angle D, where B/2 is the tilt angle derived from equations (1), (2) and (3), i.e. the tilt angle for the case of the incident ray parallel to the axis of symmetry.

Also, it will be understood by anyone skilled in the art that various compromise situations may be suggested for seasonal changes in the sun's elevation, even though they will obtain something less than the optimum aberration correction. For example, the axis of symmetry could be set at one or more mid-season angles, or the angles of tilt could be fixed for optimum focusing at one or more mid-season settings and in between such angles or settings there would be some defocussing.

It may be noted that the width of the individual thin strip mirrors, e.g. mirrors 19 indicated in FIG. 1, or strip reflectors 41 indicated in FIG. 4, or reflectors 83 indicated in FIG. 7, may vary without affecting the results to any great extent. Thus, by having the strip reflectors constructed with reflecting surfaces on both sides thereof, any overlap created in regard to a particular angle of incidence of parallel solar rays or the like, would not destroy the effectiveness because there would be internal reflecting paths between adjacent strips. Such effect is schematically indicated in FIG. 6, where a particular thin-line ray 49a is indicated as reflecting from a strip reflector 86 and then reflecting again from the other side of adjacent reflector strip 87 back onto the reflector strip 86, followed by reflecting down to the surface of the concave cylindrical reflector indicated.

It will be appreciated that many different and varied uses may be made of the concepts according to this invention. And, while it is particularly applicable to solar heat collection and energy collection from parallel rays of similar radiation, the principles may be applicable to various other uses wherever a focus improving arrangement according to the invention might apply.

While particular embodiments of the invention have been described above in considerable detail in accordance with the applicable statutes, this is not to be taken as in any way limiting the invention, but merely as being descriptive thereof.

We claim:

1. Solar heat collector, comprising
a concave cylindrical reflecting surface,
a plurality of narrow flat reflecting strips oriented with the longitudinal dimensions thereof parallel to the geometric axis of said cylindrical surface, and
means for setting said strips at predetermined angles to correct for cylindrical aberration in focusing of parallel rays directed toward said concave reflecting surface.

2. A solar heat collector according to claim 1 wherein
said strips are located with the longitudinal axes spaced diametrically across relative to said cylindrical surface.

3. A solar heat collector according to claim 2, also comprising
a conduit for carrying a fluid to be heated therein, and
said conduit being located parallel to the geometric axis of said cylindrical surface and at the focal line of said parallel rays.

4. Solar hear collector according to claim 3, wherein
said strips have reflecting surfaces on both sides thereof.

5. Solar heat collector, comprising
a concave cylindrical reflecting surface,
a plurality of narrow flat reflecting strips having reflecting surfaces on both sides thereof and being oriented with the longitudinal dimensions thereof parallel to the geometric axis of said cylindrical surface.
means for locating said strips with the longitudinal axes spaced diametrically across relative to said cylindrical surface,
means for setting said strips at predetermined angles to correct for cylindrical aberration in focusing of parallel rays directed toward said concave reflecting surface, and
a conduit located parallel to the geometric axis of said cylindrical surface and at the focal line of said parallel rays, said conduit being adapted for carrying a fluid to be heated therein.

6. In combination with a cylindrical reflector having a circular cross section, focus-improving means for incident parallel rays, comprising
an array of plane mirrors diametrically situated relative to said cylindrical reflector,
each of said mirrors being thin and reflecting from both faces thereof,
each of said mirrors extending longitudinally parallel to the axis of said cylindrical reflector, and
each of said mirrors having an angle of tilt relative to said parallel rays such that a central line of rays incident upon the longitudinal axis of each mirror will focus along a common line parallel to the axis of said cylindrical reflector.

7. Solar energy collector, comprising in combination
an elongated cylindrical reflector adapted for east-west orientation and having a longitudinal plane of symmetry,
a plurality of thin strip reflectors mounted with the axes thereof parallel to said east-west orientation and lying along a diametrical plane relative to said cylindrical reflector,
said strip reflectors having the planes thereof oriented at angles relative to said plane of symmetry for correcting the cylindrical aberration of said cylindrical reflector.

8. Solar energy collector according to claim 7, wherein
said strip reflectors have reflecting surfaces on both sides thereof.

9. Solar energy collector according to claim 8, also comprising
solar energy utilization means located at a focal center of said cylindrical reflector after said correction.

10. Solar energy collector according to claim 9, comprising
a plurality of said collectors, and
means for joining the individual utilization means of said plurality of collectors together.

11. Solar energy collector according to claim 9, also comprising
means for moving said strip reflectors in order to accomodate the seasonal variations in angle of elevation of the sun.

12. Solar energy collector according to claim 11, wherein
said strip reflectors moving means comprises a pivotal support for said strip reflectors and said utilization means.

13. Solar energy collector according to claim 11, wherein
said strip reflectors moving means comprises means for rotating said strip reflectors about the axes thereof.

14. Solar energy collector according to claim 13, wherein
said strip reflectors rotating means comprises gear means concentric with said axes and worm means for rotating said gear means simultaneously.

15. Solar energy collector, comprising in combination
an elongated cylindrical reflector adapted for east-west orientation and having a longitudinal plane of symmetry,
a plurality of thin strip reflectors having reflecting surfaces on both sides thereof and mounted with the longitudinal axes thereof parallel to said east-west orientation,
said longitudinal axes lying in a diametrical plane relative to said cylindrical reflector,
said strip reflectors having the planes thereof oriented at angles relative to said plane of symmetry for correcting cylindrical aberration of said cylindrical reflector to focus said solar energy along a line on said plane of symmetry, and
means for moving said strip reflectors in order to accommodate the seasonal variations in angle of elevation of the sun,
said moving means, comprising
gear means concentric with said thin strip longitudinal axes, and
worm means for rotating said gear means simultaneously through equal angles in order to vary said orientation angles in carrying out said seasonal accommodation.

16. Solar energy collector, comprising in combination
a cylindrical reflector mounted on the earth's surface with an east-west orientation, an array of thin strip reflectors arranged diametrically across said cylindrical reflector for correcting cylindrical aberration, means for pivotally mounting said array about the axis of said cylindrical reflector to permit rotation thereof to maintain said diametrical arrangement transversely relative to the sun's rays with seasonal variation in the angle of elevation of the sun, and solar energy utilization means mounted on said pivotal means for maintaining it at a focal center of said cylindrical reflector after correction for aberration by said array.

* * * * *